US012435909B2

(12) United States Patent
Maynard

(10) Patent No.: US 12,435,909 B2
(45) Date of Patent: Oct. 7, 2025

(54) SYSTEMS AND METHODS OF USING CASCADING HEAT PUMPS FOR IMPROVEMENT OF COEFFICIENT OF PERFORMANCE

(71) Applicant: Mark J. Maynard, Easthampton, MA (US)

(72) Inventor: Mark J. Maynard, Easthampton, MA (US)

(*) Notice: Subject to any disclaimer, the term of this patent is extended or adjusted under 35 U.S.C. 154(b) by 264 days.

(21) Appl. No.: 18/132,297

(22) Filed: Apr. 7, 2023

(65) Prior Publication Data

US 2023/0324084 A1  Oct. 12, 2023

Related U.S. Application Data

(60) Provisional application No. 63/328,763, filed on Apr. 8, 2022.

(51) Int. Cl.
*F25B 7/00* (2006.01)
*F25B 39/00* (2006.01)
(Continued)

(52) U.S. Cl.
CPC ............... *F25B 7/00* (2013.01); *F25B 39/00* (2013.01); *F25B 41/22* (2021.01); *F25B 49/02* (2013.01);
(Continued)

(58) Field of Classification Search
CPC .......... F25B 41/22; F25B 39/00; F25B 49/02; F25B 2500/18; F25B 2700/1352
See application file for complete search history.

(56) References Cited

U.S. PATENT DOCUMENTS 261,605 A    7/1882  Hill
688,520 A   12/1901  Hill
(Continued)

FOREIGN PATENT DOCUMENTS

CN    1277928 A    12/2000
CN  101149039 A     3/2008
(Continued)

OTHER PUBLICATIONS

Brazilian Office Action for Patent Application No. BR112020003911-0, filed Sep. 13, 2022,.
(Continued)

*Primary Examiner* — Nael N Babaa
(74) *Attorney, Agent, or Firm* — Nutter McClennen & Fish LLP

(57) ABSTRACT

A system utilizing cascading heat pump circuits (HPCs) is employed to efficiently transfer heat from low temperature reservoirs to high temperature reservoirs. The system of cascading (e.g., multistage) HPCs include at least two HPCs that are in thermal communication. The first HPC uses a first refrigerant and is configured to raise a first cold operating temperature to a first hot operating temperature. The second HPC uses a second refrigerant and is configured to raise a second cold operating temperature to a second hot operating temperature. The second HPC is in thermal communication with the first HPC through a thermal exchange block, which allows the transfer of heat between the HPCs and causes the first hot temperature to be equilibrated with the second cold temperature. The cascading HPC system also includes a system controller that is configured to optimize the coefficient of performance (COP) of the cascading HPC system.

14 Claims, 8 Drawing Sheets

(51) Int. Cl.
    *F25B 41/22* (2021.01)
    *F25B 49/02* (2006.01)
(52) U.S. Cl.
    CPC ... *F25B 2500/18* (2013.01); *F25B 2600/2515* (2013.01); *F25B 2700/1352* (2013.01)

(56) References Cited

U.S. PATENT DOCUMENTS

| | | |
|---|---|---|
| 1,339,137 A | 5/1920 | Rogers |
| 2,280,845 A | 4/1942 | Parker |
| 2,298,984 A | 10/1942 | Stinson et al. |
| 2,725,181 A | 11/1955 | Lamberton |
| 2,849,173 A | 8/1958 | Surdy |
| 3,002,923 A | 10/1961 | Barker et al. |
| 3,014,639 A | 12/1961 | Gwinner |
| 3,232,524 A | 2/1966 | Rice |
| 3,360,926 A | 1/1968 | Parr |
| 3,375,664 A | 4/1968 | Wells, Jr. |
| 3,601,979 A | 8/1971 | Singer |
| 3,608,311 A | 9/1971 | Roesel, Jr. |
| 3,658,442 A | 4/1972 | Heitmann et al. |
| 3,850,817 A | 11/1974 | Barthel |
| 3,984,698 A | 10/1976 | Brewer |
| 3,988,897 A | 11/1976 | Strub |
| 4,041,710 A | 8/1977 | Kraus |
| 4,097,202 A | 6/1978 | Price |
| 4,135,364 A | 1/1979 | Busick |
| 4,266,402 A | 5/1981 | Pruett |
| 4,326,132 A | 4/1982 | Bokel |
| 4,392,062 A | 7/1983 | Bervig |
| 4,430,858 A | 2/1984 | Shaw |
| 4,742,242 A | 5/1988 | De Shon |
| 4,767,938 A | 8/1988 | Bervig |
| 4,800,727 A | 1/1989 | Petrick |
| 4,832,578 A | 5/1989 | Putt |
| 4,947,647 A | 8/1990 | Jensen |
| 4,947,655 A | 8/1990 | Shaw |
| 5,461,861 A | 10/1995 | Wenzel |
| 5,899,066 A | 5/1999 | Brassea-Flores |
| 6,203,285 B1 | 3/2001 | Wagner |
| 6,223,532 B1 | 5/2001 | Brassea-Flores |
| RE37,603 E | 3/2002 | Coney |
| 6,447,243 B1 | 9/2002 | Kittle |
| 6,695,591 B2 | 2/2004 | Grimmer |
| 6,990,809 B2 | 1/2006 | Abouraphael |
| 7,222,487 B1 | 5/2007 | Hinkley |
| 7,226,895 B2 | 6/2007 | Xiang |
| 7,584,610 B2 | 9/2009 | Ziegenfuss |
| 8,008,796 B2 | 8/2011 | Muchow |
| 8,397,496 B2 | 3/2013 | Frank |
| 8,572,959 B2 | 11/2013 | Ingersoll et al. |
| 8,667,798 B2 | 3/2014 | Hopper et al. |
| 8,813,488 B2 | 8/2014 | Gibson et al. |
| 8,869,531 B2 | 10/2014 | Held |
| 9,587,162 B2 | 3/2017 | Fisk, Jr. |
| 9,856,850 B1 | 1/2018 | Sheehan |
| 10,543,737 B2 | 1/2020 | Kujak |
| 10,683,839 B2 | 6/2020 | Maynard |
| 10,989,110 B2 | 4/2021 | Maynard |
| 2002/0083708 A1 | 7/2002 | Kono et al. |
| 2003/0175128 A1 | 9/2003 | Fabry |
| 2003/0192338 A1 | 10/2003 | Manohar |
| 2004/0011038 A1 | 1/2004 | Stinger |
| 2005/0189888 A1 | 9/2005 | Federman |
| 2006/0037337 A1 | 2/2006 | Lear et al. |
| 2006/0236698 A1 | 10/2006 | Langson |
| 2007/0065300 A1 | 3/2007 | Mariani |
| 2007/0189111 A1 | 8/2007 | Garza |
| 2008/0008602 A1 | 1/2008 | Pozivil |
| 2008/0303282 A1 | 12/2008 | Ziegenfuss |
| 2009/0031999 A1 | 2/2009 | Erickson |
| 2009/0127866 A1 | 5/2009 | Cook |
| 2009/0257902 A1 | 10/2009 | Ernens |
| 2009/0297368 A1 | 12/2009 | Knox |
| 2010/0032133 A1 | 2/2010 | Lifson |
| 2010/0077788 A1 | 4/2010 | Lewis |
| 2010/0146961 A1 | 6/2010 | Silva |
| 2010/0259044 A1 | 10/2010 | Muchow |
| 2010/0319346 A1 | 12/2010 | Ast |
| 2010/0326100 A1 | 12/2010 | Taras |
| 2011/0049899 A1 | 3/2011 | Hoffman |
| 2011/0120157 A1 | 5/2011 | Wohlert |
| 2011/0201699 A1 | 8/2011 | Lucas |
| 2012/0087810 A1 | 4/2012 | Peussa |
| 2012/0090312 A1 | 4/2012 | Wilson et al. |
| 2012/0100015 A1 | 4/2012 | Kim |
| 2012/0117988 A1 | 5/2012 | Mitra |
| 2012/0174605 A1 | 7/2012 | Huff |
| 2013/0031934 A1 | 2/2013 | Huff |
| 2013/0055756 A1 | 3/2013 | Tsutsumi |
| 2013/0098102 A1 | 4/2013 | Nakayama |
| 2013/0129531 A1 | 5/2013 | Baker |
| 2014/0137582 A1 | 5/2014 | Louvar et al. |
| 2014/0197642 A1 | 7/2014 | Daya |
| 2014/0250879 A1 | 9/2014 | Moncada |
| 2015/0159919 A1 | 6/2015 | Sato |
| 2016/0185473 A1 | 6/2016 | Zucchini |
| 2016/0187893 A1 | 6/2016 | Bergh |
| 2016/0327049 A1 | 11/2016 | Dinsdale |
| 2017/0074268 A1 | 3/2017 | De Kerpel |
| 2017/0248349 A1 | 8/2017 | Kujak et al. |
| 2017/0254223 A1 | 9/2017 | Goethals et al. |
| 2017/0268498 A1 | 9/2017 | Kasahara |
| 2018/0223846 A1 | 8/2018 | Staffend et al. |
| 2019/0063396 A1 | 2/2019 | Maynard |
| 2019/0218968 A1 | 7/2019 | Maynard |
| 2020/0309085 A1 | 10/2020 | Maynard |
| 2021/0340906 A1 | 11/2021 | Maynard |
| 2022/0316483 A1 | 10/2022 | Maynard |
| 2024/0125519 A1* | 4/2024 | Taras ............ F25B 13/00 |

FOREIGN PATENT DOCUMENTS

| | | |
|---|---|---|
| CN | 203629155 U | 6/2014 |
| CN | 107278253 A | 10/2017 |
| CN | 109579337 A | 4/2019 |
| CN | 113310235 A | 8/2021 |
| EP | 1010954 A1 | 6/2000 |
| EP | 2549095 A1 | 1/2013 |
| FR | 2919716 A1 | 2/2009 |
| GB | 2318393 A | 4/1998 |
| JP | H10587299 U | 11/1993 |
| JP | 2002235653 A | 8/2002 |
| WO | 2010125511 A1 | 11/2010 |
| WO | 2012017243 A1 | 2/2012 |
| WO | 2012079171 A1 | 6/2012 |
| WO | 2014110160 A3 | 10/2014 |
| WO | 2017125276 A1 | 7/2017 |

OTHER PUBLICATIONS

Eurasian Office Action for Eurasian Patent Application No. 202091729, dated Apr. 21, 2021, 3 pages.
European Patent Office, Extended European Search Report for Patent Application No. 22153119.7, dated Jul. 8, 2022, 7 pages.
European Patent Office, Supplementary Search Report for Application No. 18850618.2, dated Dec. 3, 2020, 7 pages.
Examination Report for Indian Patent Application No. 202017032848 dated Mar. 29, 2022, 6 pages.
Indonesian Patent Office, Office Action for Application No. P00202000591 dated Aug. 8, 2022, 5 pages.
International Search Report and Written Opinion for International Patent Application No. PCT/US2019/014039, mailed Apr. 29, 2019, 7 pages.
International Search Report and Written Opinion for International Patent Application No. PCT/US2018/048413, mailed Jan. 4, 2019, 15 pages.
International Preliminary Report on Patentability for Application No. PCT/US2018/048413, mailed Mar. 12, 2020, 10 pages.
Israel Patent Office, Notice of Deficiencies for Patent Application 276061, dated Oct. 3, 2022, 3 pages.

(56) References Cited

OTHER PUBLICATIONS

Intellectual Property Office of the Philippines, Substantive Examination Report for Allowance, for Patent Application No. 1/2020/551095, dated Oct. 18, 2022, 4 pages.
International Search Report and Written Opinion for International Patent Application No. PCT/US23/17948, mailed Jul. 7, 2023, 8 pages.

* cited by examiner

SYSTEMS AND METHODS OF USING CASCADING HEAT PUMPS FOR IMPROVEMENT OF COEFFICIENT OF PERFORMANCE

PRIORITY

This patent application claims priority from Provisional U.S. Patent Application No. 63/328,763, filed Apr. 8, 2022, the disclosure of which is incorporated herein, in its entirety, by reference.

FIELD OF THE INVENTION

The present disclosure generally relates to multistage heat pump systems and methods and, more particularly, relates to cascading heat pump circuits for heating and air conditioning applications with improved coefficients of performance.

BACKGROUND OF THE INVENTION

The heat pump is a well-known piece of equipment in the world of thermodynamics. It is known for being able to move large sums of heat while spending relatively small amounts of energy to do so. The coefficient of performance (COP) of any heat pump is rarely even remotely close to its theoretical ideal limit. For many years scientists have sought to improve the capabilities of heat pumps to come closer to the theoretical limit of the COP, it has however proven difficult to approach the lofty standards of what is theoretically possible.

SUMMARY OF VARIOUS EMBODIMENTS

In accordance with an embodiment of the invention, a cascading heat pump system includes a first heat pump circuit. The first heat pump circuit uses a first refrigerant and is configured to raise a first cold operating temperature to a first hot operating temperature. The first heat pump circuit includes a first evaporator positioned in a first exchanger (E/C) block. The first evaporator is configured to transfer heat from an outside source to the first refrigerant. The first heat pump circuit also includes a first compressor in fluid communication with the first evaporator and configured to receive the first refrigerant from the first evaporator, to compress the first refrigerant, and to heat the first refrigerant. The first heat pump circuit further includes a first condenser in fluid communication with the first compressor and configured to condense the first refrigerant.

The cascading heat pump system also includes a second heat pump circuit. The second heat pump circuit uses a second refrigerant and is configured to raise a second cold operating temperature to a second hot operating temperature. The second heat pump circuit is in thermal communication with the first heat pump circuit. The thermal communication is through a second E/C block. The second heat pump circuit includes a third evaporator positioned in the second E/C block and in thermal communication with the first condenser. The second refrigerant in the third evaporator is configured to receive a transfer of heat from the first refrigerant in the first condenser. The second heat pump circuit also includes a second compressor configured to receive the second refrigerant from the third evaporator, to compress the second refrigerant, and to heat the second refrigerant. The second heat pump circuit also includes a second condenser configured to condense the second refrigerant.

The cascading heat pump system also includes a system controller operatively coupled to the cascading heat pump system. The system controller is configured to optimize the coefficient of performance (COP) of the cascading heat pump system as a function of output from at least one of two flow meters and/or the system sensors. The second cold operating temperature is approximately equal to the first hot operating temperature. A total operating range of the cascading heat pump system is the difference between the first cold operating temperature and the final hot operating temperature.

The cascading heat pump system may further include a first throttle valve positioned between the second condenser and the third evaporator. The second refrigerant may be conveyed from the second condenser to the first throttle valve. The second refrigerant also may be conveyed from the first throttle valve to the third evaporator. A first flow meter may be positioned before the first throttle valve. The first flow meter may be configured to measure the amount of the second refrigerant entering into the first throttle valve.

The cascading heat pump system may further include a second throttle valve positioned between the first condenser and the first evaporator. The first refrigerant may be conveyed from the first condenser to the second throttle valve. The first refrigerant also may be conveyed from the first throttle valve to the first evaporator.

The cascading heat pump system may further include a second flow meter positioned before the second throttle valve. The second flow meter may be configured to measure the amount of the first refrigerant entering into the second throttle valve.

The cascading heat pump system may further include a third heat pump circuit. The third heat pump circuit may use a third refrigerant configured to raise a third cold operating temperature to a third hot operating temperature. The third heat pump circuit may be in thermal communication with the second heat pump circuit. The third cold operating temperature may be approximately equal to the second hot operating temperature.

The first refrigerant and the second refrigerant may each comprise at least one of hydrocarbons or fluorinated hydrocarbons. The fluorinated hydrocarbons may include at least one of R4104a or R5134a. In some embodiments, the first refrigerant may include R410a. In some embodiments, the second refrigerant may include R513a.

The system controller may include a first proportional-integral-derivative (PID) controller in electrical communication with the first throttle valve 5301 and the system controller. The first PID controller may be configured to control the first throttle valve.

The system controller may also include a second PID controller in electrical communication with the second throttle valve and the system controller. The second PID controller may be configured to control the second throttle valve.

The system controller may also include a first variable frequency drive (VFD) in electrical communication with the first compressor and the system controller. The first VFD may be configured to control a frequency of the first compressor.

The system controller may also include a second VFD in electrical communication with the second compressor and the system controller. The second VFD may be configured to control a frequency of the second compressor.

In some embodiments, the system controller may also include a first electronic proportioning controller in electrical communication with the first throttle valve and the system controller. The first electronic proportioning controller may be configured allow low quality second refrigerant fluid ratio to pass into the third evaporator.

In some embodiments, the system controller may also include a second electronic proportioning controller in electrical communication with the second throttle valve and the system controller. The second electronic proportioning controller configured allow low quality first refrigerant fluid ratio to pass into the first evaporator.

In accordance with an embodiment of the invention, a cascading air conditioning (A/C) system 5010 includes a first A/C circuit 5001. The first A/C circuit 5001 uses a first refrigerant configured to raise a first cold operating temperature to a first hot operating temperature. The first A/C circuit 5001 includes a second evaporator 5402 positioned in a second exchanger (E/C) block 5803. The second evaporator 5402 is configured to transfer heat from an outside source to the first refrigerant. The first A/C circuit 5001 also includes a first compressor 5101 in fluid communication with the second evaporator 5402. The first compressor 5101 is configured to receive the first refrigerant from the second evaporator 5402, to compress the first refrigerant, and to heat the first refrigerant. The first condenser 5201 is in fluid communication with the first compressor 5101 and configured to condense the first refrigerant.

The cascading air conditioning (A/C) system 5010 also includes a second A/C circuit 5002. The second A/C circuit 5002 uses a second refrigerant configured to raise a second cold operating temperature to a second hot operating temperature. The second heat pump circuit 5002 is in thermal communication with the first heat pump circuit 5001. The thermal communication is through a second E/C block 5802. The second heat pump 5201 includes a third evaporator 5403 positioned in the second E/C block 5802 in thermal communication with the first condenser 5201. The second refrigerant in the third evaporator 5403 is configured to receive a transfer of heat from the first refrigerant in the first condenser 5201. The second compressor 5102 is configured to receive the second refrigerant from the third evaporator 5403, to compress the second refrigerant, and to heat the second refrigerant. The third condenser 5203 is configured to condense the second refrigerant.

The cascading air conditioning (A/C) system 5010 also includes a system controller operatively coupled to the cascading A/C system 5010. The system controller is configured to optimize a coefficient of performance (COP) of the cascading A/C system 5010 as a function of output from at least one of two flow meters and/or system sensors.

The second cold operating temperature is approximately equal to the first hot operating temperature. A total operating range of the cascading A/C system 5010 is the difference between the first cold operating temperature and the final hot operating temperature.

The cascading A/C system 5010 may further include a first throttle valve 5301 positioned between the third condenser 5203 and the third evaporator 5403. The second refrigerant may be conveyed from the third condenser 5203 to the first throttle valve 5301. The second refrigerant may also be from the first throttle valve 5301 to the third evaporator 5403. A first flow meter 6001 may be positioned before the first throttle valve 5301 and configured to measure an amount of the second refrigerant entering into the first throttle valve. A third throttle valve 5303 may be positioned between the first condenser 5201 and the second evaporator 5402. The first refrigerant may be conveyed from the first condenser 5201 to the third throttle valve 5303. The first refrigerant may be conveyed from the third throttle valve 5303 to the second evaporator 5402. A third flow meter 6003 may be positioned before the third throttle valve 5303 and configured to measure an amount of the first refrigerant entering into the third throttle valve 5303.

The cascading A/C system 5010 may further include a third A/C circuit. The third A/C circuit may use a third refrigerant configured to raise a third cold operating temperature to a third hot operating temperature. The third A/C circuit may be in thermal communication with the second heat pump circuit. The third cold operating temperature may be approximately equal to the second hot operating temperature.

The first refrigerant and the second refrigerant may each comprise at least one of hydrocarbons, fluorinated hydrocarbons, or water. The fluorinated hydrocarbons may include at least one of R4104a or R5134a. The first refrigerant may include R410a. The second refrigerant may include R513a.

The system controller may include a first proportional-integral-derivative (PID) controller in electrical communication with the first throttle valve 5301 and the system controller. The first PID controller may be configured to control the first throttle valve.

The system controller may also include a second PID controller in electrical communication with the third throttle valve 5303 and the system controller. The second PID controller may be configured to control the third throttle valve 5303.

The system controller may further include a first variable frequency drive (VFD) in electrical communication with the first compressor 5101 and the system controller. The first VFD may be configured to control a frequency of the first compressor 5101.

The system controller may yet further include a second VFD in electrical communication with the second compressor 5102 and the system controller. The second VFD may be configured to control a frequency of the second compressor 5102.

The system controller may yet further include a first electronic proportioning controller in electrical communication with the first throttle valve 5301 and the system controller. The first electronic proportioning controller may be configured allow low quality second refrigerant fluid ratio to pass into the third evaporator 5403.

The system controller may yet further include a third electronic proportioning controller in electrical communication with the third throttle valve 5303 and the system controller. The third electronic proportioning controller may be configured allow low quality first refrigerant fluid ratio to pass into the second evaporator 5402.

DESCRIPTION OF ILLUSTRATIVE EMBODIMENTS

Figure 1:
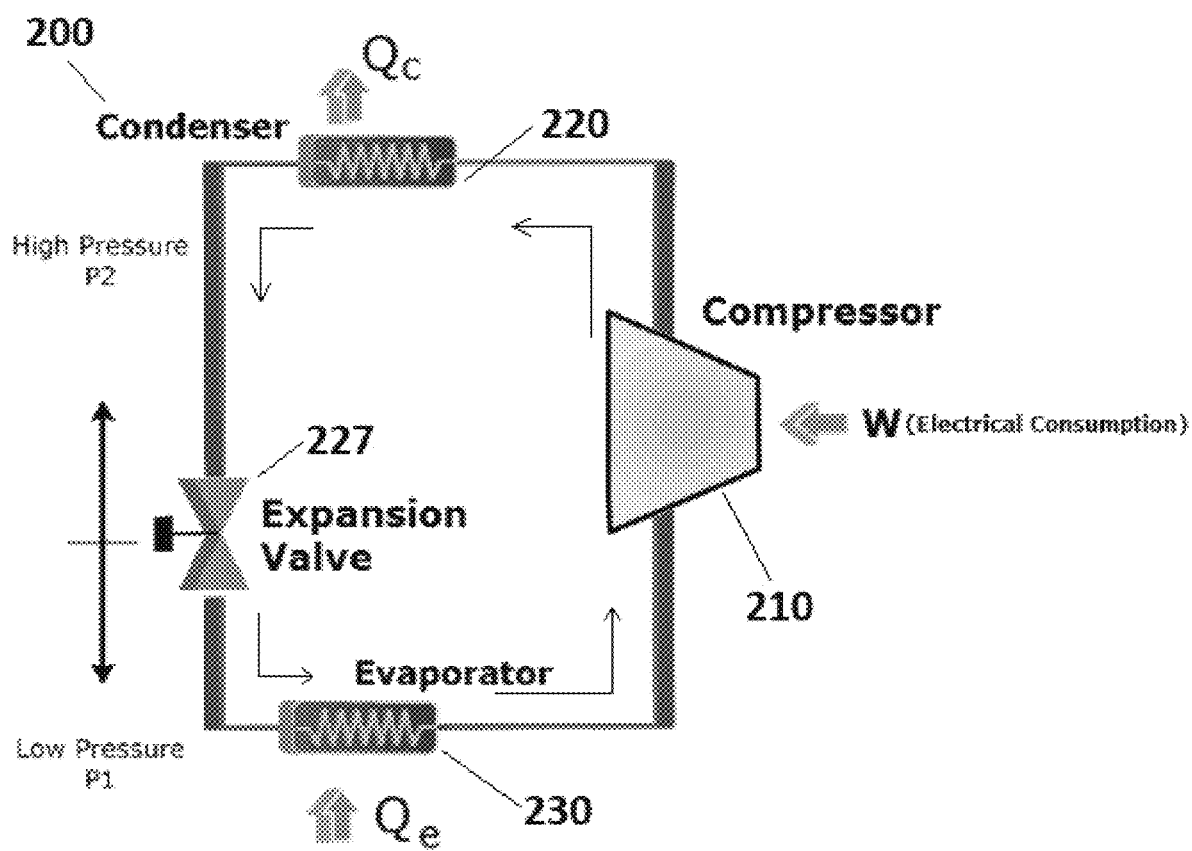
FIG. 1 schematically illustrates elements comprising a heat pump circuit according to embodiments of the present disclosure.

Described herein are systems and methods for transferring heat from low temperature reservoirs to high temperature reservoirs using less input work than conventional systems. In accordance with embodiments of the current disclosure, a system utilizing cascading heat pump circuits is employed to efficiently transfer heat from low temperature reservoirs to high temperature reservoirs. The system of cascading heat pump circuits (e.g., multistage heat pump circuits) include at least two heat pump circuits (HPCs) that are in thermal communication.

The first heat pump circuit uses a first refrigerant and is configured to raise a first cold operating temperature to a first hot operating temperature. The first heat pump circuit includes a first evaporator positioned in a first exchanger (E/C) block. The first evaporator is configured to transfer heat from an outside source to the first refrigerant. The second heat pump circuit uses a second refrigerant and is configured to raise a second cold operating temperature to a second hot operating temperature. The second heat pump circuit is in thermal communication with the first heat pump circuit. The thermal communication is through a second E/C block.

The cascading heat pump system also includes a system controller operatively coupled to the cascading heat pump system. The system controller is configured to optimize the coefficient of performance (COP) of the cascading heat pump system as a function of output from at least two of the flow meters and/or system sensors.

Heat Pumps

Heat will flow spontaneously from a region of higher temperature to a region of lower temperature. Heat will not flow spontaneously from lower temperature to higher but it can be made to flow in this direction if work is performed. The work required to transfer a given amount of heat is usually appreciably less than the work inherent in an amount of heat being moved; this is the motivation for using heat pumps in applications such as heating water and the interior of buildings. That is, a given amount of heat is a form of stored energy (e.g., work) that is equivalent to the amount of energy/work that was required to generate that stored heat energy.

This can be conceptualized by realizing that in heating your home, energy required to generate the heat in a method like resistance heating is much greater that the energy required to move the same amount of heat from the colder outside ambient air into the air inside that same home. The amount of work required to drive an amount of heat from a lower-temperature reservoir, such as ambient air, to a higher-temperature reservoir, such as the interior of a building, is:

$$W = Q/COP \qquad \text{Eq. 1}$$

Where W is the work performed on the working fluid by the heat pump's compressor, Q is the useful heat transferred from the lower-temperature reservoir to the higher-temperature reservoir, and COP is the instantaneous coefficient of performance for the heat pump at the temperatures prevailing in the reservoirs at that instant. It is useful in this scenario to understand how the heat pump is being used. If the heat pump is used for heating, Q is the amount of heat transferred into the high temperature reservoir. Where, if the heat pump is used for cooling, Q is the amount of heat being transferred out of the low temperature reservoir.

The coefficient of performance of a heat pump is usually greater than unity. In such a case, the work required is less than the heat moved, making a heat pump a more effective form of heating than electrical resistance heating where the heat generated is at best the same amount as the energy spent. If the temperature of the higher-temperature reservoir increases or the temperature of the lower-temperature reservoir decreases, the coefficient of performance decreases, causing an increasing amount of work to be required for each unit of heat being moved.

In the world of thermodynamics, heat pumps are unique and extremely clever devices which utilize state change of a special substance to move heat from a low temperature heat reservoir to a high temperature heat reservoir. One example of the most common heat pump used every day is a refrigerator.

In this example, the low temperature region is inside the refrigerator and the high temperature region is the surrounding house. In normal conditions, a refrigerator uses more electricity when the temperature in the house rises or when the temperature of the refrigerator is set lower. In other words, the refrigerator uses more electricity when the difference in temperatures between the house and the inside of the refrigerator is greater.

A conventional heat pump has four main components; a compressor, a condenser, an expansion valve, and an evaporator. A heat pump also includes a refrigerant fluid that is cycled from a gas to a liquid in the closed cycle of the heat pump. That is, the refrigerant may exist in a gaseous state, a liquid state, or in a mixture of both states. In many cases the refrigerant fluid exists as a gas and a fluid simultaneously. So, during selected processes the refrigerant fluid may be simultaneously in a liquid state and a gaseous state, even though the fluid will be primarily in one state or the other.

At the start of a heat pump circuit cycle, just before the compressor, the refrigerant fluid is in a (primarily) gaseous state; the refrigerant is then compressed by the compressor to a higher pressure, which also raises its temperature because it is an adiabatic, isentropic process, meaning that all the energy in the refrigerant remains in the refrigerant and the entropy remains constant. However, after compression, the energy now occupies a smaller volume, resulting in a higher temperature. Next, the refrigerant fluid is passed through a condenser, which cools the refrigerant to a lower temperature while maintaining the pressure. In the condenser, the refrigerant fluid changes state from gas to (primarily) liquid. Next the (primarily) liquid refrigerant fluid passes through the throttle valve, which decreases the pressure and exchanges no energy. Finally, the evaporator heats the cold liquid refrigerant fluid and evaporates it before it returns to the compressor, while maintaining constant pressure.

During the expansion process through the throttle valve, the refrigerant goes from fully liquid state to a liquid-gas mixture. The ratio of liquid to gas is known as the quality of the refrigerant. The closer the pressures and temperatures on the two sides of the expansion valve are to each other, the lower the quality of the substance will be after the process, meaning there is more liquid available for the boiling process in the evaporator. In the cascading HPC systems, a lower quality substance (e.g., refrigerant fluid) is better for maintaining a higher COP and capacities.

Control Systems

There are many configurations of using heat pumps in HVAC (heating, ventilation, and air conditioning. Examples include conventional heat pumps, air conditioners, multi-stage heat pumps, and the like. Typically, the various heat pump configurations use an individual heat pump circuit (HPC) superheat to control the flow of refrigerant in each HPC. This method is used for single stage systems and prevents liquid refrigerant from entering the compressor. Using superheat guarantees the quality ratio (ratio of gas to liquid after the expansion valve) is high (mostly gas) to protect the compressor.

However, the inventor has found that using superheat from an induvial HPC is not effective to control the flow of refrigerant in each HPC of a cascading HPC system. Using an induvial HPC superheat to control a cascading HPC system does not optimize operation of each of the low temperature compressor and the high temperature compressor. For example, creating the right conditions in the low temperature compressor to work optimally is unlikely the best conditions for the high temp compressor to work optimally, and vice versa. Nonetheless, the industry carried over the method of using superheat and a single HPC to control multistage HPC systems in an effort to increase the temperature range over which a multistage HPC system could operate.

What the inventor discovered, and what was not apparent to the industry, was that cascading HPC systems could be optimized to use low quality refrigerant ratios and computer controllers, instead of superheat to further extend operational range, increase capacity, but more importantly, to significantly reduce energy consumption and improve the overall efficiency. This was surprising and unexpected.

Using superheat is not the best method to control a cascading HPC system, because it prevents the use of lower quality ratios in the system. Utilizing a cascading HPC system does not in itself give the energy reduction or capacity increase that the industry is looking for. It is important to remember, the compressors need to do work to set the right conditions necessary for the phase change of the refrigerant to occur in the evaporator and condenser in the individual HPC, at the environmental conditions, at the time of operation. If the first stage HPC is not operating at the same volumetric and thermal capacity conditions as the second stage HPC, then the second stage compressor will be required to do more work to have the two systems (e.g., stages) balance the heat and the refrigerant flow. The necessary changes in pressure and temperature to the second compressor can in turn apply a load back to the first compressor. Ultimately the two compressors need to find an equilibrium of pressure and temperature to each other to move the heat from the low temperature compressor to the high temperature compressor. Using superheat, it is unlikely that the point of equilibrium between the high and low temperature compressors is at an optimum level for the overall efficient operation of the entire system. Any work the system does requires energy and lowers the performance (e.g., COP) of the overall (e.g., multistage) system The disclosed control system addresses this issue at the most fundamental level by using the ratio of the latent heats, the total enthalpy of the two different refrigerants, and the volumetric differences to calculate the exact ratio of the two different refrigerants needed to balance the energy flow of the system at any given temperature and pressure condition across the cascading HPC system. The control system uses flow meters and system sensors to determine the proper speed (e.g., frequency) of each of the two compressors to similarly match the exact volumetric flow conditions. This allows a minimal amount of work required by the compressors and reduces the overall energy used. At the same time, this allows the quality ratio after the expansion valve to be lowered. The ability to use a lower quality ratio substantially increases the thermal capacity of the system and does not apply a significant load to the compressors.

It is imperative to know the exact amount of refrigerant entering into each of the expansion valves. A high-quality liquid flow meter must be installed just before each of the expansion valves in the disclosed cascading HPC system. These liquid flow calculations can be estimated mathematically, but the resulting data is not precise enough to adequately control the cascading HPC system to achieve the superior energy saving, capacities, and risk reduction of allowing liquid to enter the compressors. So, a critical element of this cascading HPC control system are the flow meters and system sensors which continuously collect pertinent data, such as temperature, pressure, flow rate, and the like, at various places in the cascading HPC system to feed to the computer control system. Control loops may be accomplished using proportional-integral-derivative (PID) controllers to precisely keep the cascading HPC system at optimum performance and prevent liquid refrigerant from entering the compressors. By integrating real-time data from flow meters and system sensors, the control system continuously optimizes the multistage HPC to make adjustment continuously to find the absolute lowest work required by the compressors while maintaining the max COP and capacity.

For example, a multistage 2.5-ton system in heat pump mode using a high quality ratio gas uses 2.5 KWs of power and moves 2.5-tons of heat, if the delta temperatures are low and much less if the delta temperatures are high, with COPs of 4.0 to 2.5 respectively. The same 2.5-ton cascading HPC system using low quality gas moves 4.1-tons of heat with a lower 1.8 KWs of power and it will retain 85% to 100% of its capacity even at extreme temperature ranges at a Coefficient of Performance (COP) of 6.0 to 7.0.

Several design and control features increase the efficiency, COP, and temperature range of the multistage heat pump systems (e.g., cascading HPC systems). For example, limiting the temperature difference (e.g., smaller $\Delta T$) across each heat pump cycle (e.g., stage), allows the pressure difference across the expansion valve to be smaller, and the smaller pressure difference allows the quality of the refrigerant to be reduced. As described above, having a reduced quality for each pass through a throttle valve leads to a higher COP through thermal capacity, but adds little to the load on the compressor.

In addition to setting a smaller $\Delta T$, by carefully controlling the throttle valve it is possible to further control the amount of liquid in the refrigerant liquid, thereby reducing quality. This control of the throttle valve is fully controlled via the proportional-integral-derivative (PID) controller. Therefore, the quality of all the refrigerants after their throttle valves are maintained at a lower level.

Another control process may involve systems that control electronic proportioning of the throttle valve. The use of an electronic proportioning controller can be used to allow low quality gas ratio to pass into the evaporator, and evaporator condenser E/C block intercooler at the optimal levels to elevate the COP of the cascading HPC system. This significantly increases the capacity and COP of the overall system, and lowers the load on both the high and low temp compressors.

Another control process may involve controlling the operating frequency of the compressors. Controlling the cascading HPC systems also may include incorporating variable frequency drives (VFDs) to control the compressors. This process does not substantially affect the total load on the compressors, and therefore does not affect the electrical demand of the unit. The result is that the cascade heat pump moves more heat via the phase change while using a similar amount of energy to a conventional unit operating at the same conditions, thereby increasing the COP of the system so that the consumer can spend less energy, and therefore spend less money heating or cooling their home.

Conventional heat pumps increase the pressure difference between the condenser and evaporator when higher temperature differences exist. This is because the system must manipulate the boiling point of the refrigerant such that it is above the temperature of the hot reservoir when the refrigerant is in the condenser, but below the temperature of the cold reservoir when it is in the evaporator. This causes conventional systems to fail at relatively low temperature differences due to practical safety concerns (like pulling a vacuum or causing extreme pressures), or an overload of the motor in the compressor. In conventional systems, these practical limitations are unavoidable since whatever substance being used has a unique and limited set of characteristics that make it suitable for only a specific temperature range. In a multistage design, this can be avoided. Using different refrigerants that extend the useful temperature range of the overall system by limiting the pressure differences needed in each individual cycle. All that is necessary is to ensure that the useful temperature range of a given refrigerant overlaps slightly with the refrigerant immediately upstream or downstream in the series of heat pump cycles (e.g., stages).

A quality heat pump operating at a good COP of 3.0 to 4.0 uses less electrical energy than the amount of thermal energy it is moving. For example, it might only take one Watt of electricity to remove three Watts of heat from a refrigerator. The COP in this example is 3 because it is the quotient of the heat moved divided by the amount of electricity used to perform the process (COP=Q/W). In cases when the difference in temperature between the cold side and hot side is small, the COP can become a very large number; this is modeled well by the Carnot equation for finding ideal COPs. The equation is as follows:

$$COP = \frac{T_H}{T_H - T_C} \qquad \text{Eq. 2a}$$

Equation 2a is the equation to use if the useful side of the heat pump is the hot side, as is the case with a heat pump heater (common in southern US).

$$COP = \frac{T_C}{T_H - T_C} \qquad \text{Eq. 2b}$$

Equation 2b is the equation to use if the useful side of the heat pump is the cold side as is the case in a refrigerator. Where $T_H$ is the higher temperature and $T_C$ is the low temperature, it can be shown in these equations that when the high temperature and low temperature get close to one another, the COP gets very large. The difference between high temperature $T_H$ and the low temperature $T_C$ may be referred to as delta T, or more simply as $\Delta T$.

The Carnot ideal COP given by equations 2a or 2b is a value that is by all accounts unattainable. Due to constraints of refrigerants and efficiencies of modern equipment, many heat pumps fall far short of the ideal Carnot COP. A way to estimate the real COP of a system is by preforming a thermodynamic cycle analysis.

It is important to note that when using Carnot's Equation, the temperature must first be converted to Kelvin (K) from any other unit. (The Kelvin scale represents absolute temperature.)

While ideal COPs calculated by the Carnot Equation may be high, all modern refrigerators operate at COPs of less than ideal. The effect of small temperature differences (e.g., small $\Delta T$) on COPs is magnified due to the low efficiency of modern compressors, and the fact that different refrigerants operate better in certain specific temperature ranges. Therefore, by reducing the amount of work done by the compressor and optimizing the refrigerants, COPs are significantly increased. That is, by keeping $\Delta T$ small, and by using a refrigerant optimized for a given range between $T_H$ and $T_C$, it is possible to achieve COPs closer to the ideal value described by the Carnot equation.

Cascading Heat Pumps

A conventional heat pump has four main components, a compressor, a condenser, an expansion valve, and an evaporator. When assembled for operation, the four elements of the heat pump may be referred to as a heat pump circuit (e.g., HPC).

A single HPC may have a large operating temperature range between $T_H$ and $T_C$, that is a large $\Delta T$ As described above for a heat pump, a single HPC may also have a COP for a given $\Delta T$ As discussed above, the COP for a given heat pump may be increased by decreasing $\Delta T$.

In embodiments, a series of HPCs may be combined together in a manner that permits operating each HPC to have a $\Delta T$ that is one portion of a total $\Delta T_{Tot}$. That is, a series of HPCs may be arranged in a cascading refrigeration system to dramatically improve the COP of the overall heat pump system, and decrease the net amount of electricity spent.

This can be illustrated by looking at the effect on COP of using a cascading system of HPCs. A large $\Delta T$ may be broken down into several smaller $\Delta T$ steps in an effort to increase the overall COP for a given total temperature difference. For example, a given HPC may operate at a total temperature difference, $\Delta T_{Tot}$, of 48K ($\Delta T_{Tot}=T_H-T_C=321K$ (49 C)–273.5K (1 C)=48K). That HPC may be broken into a series of four separate HPCs (e.g., $HPC_{1-4}$) in series of stages that may each have a $\Delta T_{1-4}$ of 12K, for example. At least one effect of breaking the $\Delta T_{Tot}$ into a series of smaller $\Delta T_{1-4}$ steps is that the overall COP of the system will be greater than the COP of the one heat-pump that operates at $\Delta T_{Tot}$.

In this non-limiting illustration, rather than having one HPC perform all of the refrigeration work of lowering a temperature by 48 C, a cascading series of HPCs are joined in series. In this way, each HPC lowers the temperature a fraction of the total. For example, instead of terminating the refrigeration process at the end of a single cycle, in the cascading system, the heat in the first cycle is handed off to the second cycle at a higher temperature but at a lower remaining $\Delta T$. The sum of the work required by the cascading cycles is dramatically less than the electrical power needed in a conventional system that would lower the temperature in one stage.

Additionally, the refrigerant in each cycle can be more precisely selected to match the temperatures because the range of temperature from high to low is controlled and smaller because of the multiple stages (e.g., cycles). By limiting the temperature range in each cycle and adding additional cycles and specialized refrigerants, the individual cycles may have very high COPs. Because of the higher individual COPs, the overall COP is greatly improved.

E/C Exchanger Blocks

The heat in the refrigerant fluid after being compressed in the refrigeration compressor, may be exchanged with the next HPC through an E/C exchanger block. An E/C exchanger block allows for the refrigerant fluid in an upstream (upstream regarding the flow of heat) HPC to come into thermal contact with the refrigerant fluid in an a downstream (downstream regarding the flow of heat) HPC in the cascading HPCs. E/C exchanger block has two radiators in thermal contact with each other, but prevents the refrigerant fluids from physically mixing.

The refrigerant fluid from the upstream circuit enters the E/C exchanger block at a higher saturation temperature than the refrigerant fluid of the downstream circuit. The hotter upstream refrigerant fluid transfers heat to the cooler downstream refrigerant in the E/C exchanger block. The downstream refrigeration gas enters the E/C exchanger block at a lower saturation temperature than the upstream refrigeration gas. In the E/C exchanger block, the upstream refrigerant loses heat and condenses, while the downstream refrigerant fluid gains heat and evaporates. In this way, heat in an upstream HPC is passed downstream in the cascading refrigeration process. This process can be repeated as many times as is necessary to achieve the temperature range desired.

Because the number of cycles and refrigerants can be tailored to nearly any temperature range, less mild ambient conditions are not as much of a hindrance as they are for traditional single heat pump systems. Cascading heat pump systems can be equally as effective in subzero temperatures to heat structures at reduced costs, or in the context of refrigeration systems that operate at very low temperatures. High COPs in extreme temperatures and high humidity levels are made possible. Thus, by busing multiple-stage (cascading) HPC systems, it is possible to have very low electrical consumption relative to standard heat pump systems regardless of ambient conditions.

These systems also have the ability to be reversed from an air conditioning system to a high-performance heat-pump heating system and operate equally as effectively in each function. This reduces the overall capital costs for equipment, lowers operating costs, and reduces the carbon footprint of the system when compared with traditional heating and cooling methods.

Operation Under Varying External Conditions:

The underlying principle that allows the cascading heat pump to operate at superior COPs when compared to single stage systems is the ability to select the number of stages and the best refrigerant for each individual small delta temperature that exists in each of the individual HPC stages. This principle works well when the delta temperature is predetermined like in the intermediate HPCs, where the high and low temperatures are determined by the next HPC upstream or downstream of that HPC. However, the HPCs on either end of the cascade must deal with the varying conditions of their surroundings. For example, when the cascading heat pump system is working as a heater, it has no control over the temperature of the outside air that is in contact with the first HPCs evaporator. With such varying conditions one might think that a less than ideal refrigerant must be used at either end of the cascading system in order to cover the potential variations in the high and low temperatures.

The variations in temperatures could be covered by a refrigerant with a wider temperature range, however that would decrease the overall COP of the system since the refrigerant in this case would not be suited to fit every situation within the potential variations.

However, in embodiments of the cascading heat pump systems disclosed herein, a cascading HPC system may employ additional HPCs, to be included as a first or a final stage in the cascade, depending upon operating conditions.

Refrigerant Fluids

Ideally, a refrigerant fluid will have a saturation temperature suitable at the high and low pressures in the cycle to be within the operating temperature range of a given HPC so that the available heat can be used to add heat to the refrigerant on the cold, low pressure side but also used to reject heat from the refrigerant on the hot, high pressure side. A careful selection of the refrigerant is important because, if the properties of the refrigerant are optimal for the operating conditions, the compressors in the circuit will not need to work as hard to achieve the same saturation temperatures when compared to non-optimal refrigerants.

When a refrigerant does not have the optimal properties, the heat transfer isn't exclusively in the phase change realm but infringes upon the absorption and rejection of energy in the gas state. By keeping the refrigerants closer to their ideal operating temperature range, a lot of work done by the compressor can be eliminated and can enable the COP to get much closer to the Carnot ideal value.

Desirable properties for the refrigerants include a low vapor pressure, a high latent heat, and having a phase change within the range of the operating temperatures when at the correct pressures. Non-exclusive examples of refrigerants for the cascading heat pump include some hydrocarbons, as well as fluorinated hydrocarbons such as R410a and R513a.

New Refrigerant Fluids

In some embodiments of the cascading heat pump system, modern refrigerants like R-513a, R-454b, or R-32 are incorporated. These refrigerants have been engineered to have a wide operating temperature range, and because of this they sacrifice the properties that would make it an ideal refrigerant at a very narrow temperature range. Based on the strategy used in the cascading heat pump system, a wide operating temperature range for a refrigerant is not a property that is required. In order to allow the cascading heat pump to work better than it does with modern refrigerants, new refrigerants with a narrower operating temperature range might be developed that would have the ideal properties in a given narrow temperature range that would allow the refrigeration compressors to do less work compared to modern refrigerants in that same temperature range.

FIG. 1 schematically illustrates an embodiment of elements comprising a HPC 200 according to the present disclosure. The HPC 200 compresses a refrigerant fluid in the refrigeration compressor 210 to initiate the refrigeration cycle. The compressed refrigerant fluid flows into a condenser 220 where it is condensed into the liquid state. After the condenser, the refrigerant passes through an expansion valve 227, where the pressure is lowered without enthalpy being changed. The refrigerant flows into another exchanger next, the evaporator 230. The evaporator 230 receives heat from the cold side of the heat pump which vaporizes the refrigerant into a gas. The low-pressure gaseous refrigerant moves from the evaporator 230 to the compressor 210 to complete the circuit.

Figure 2:
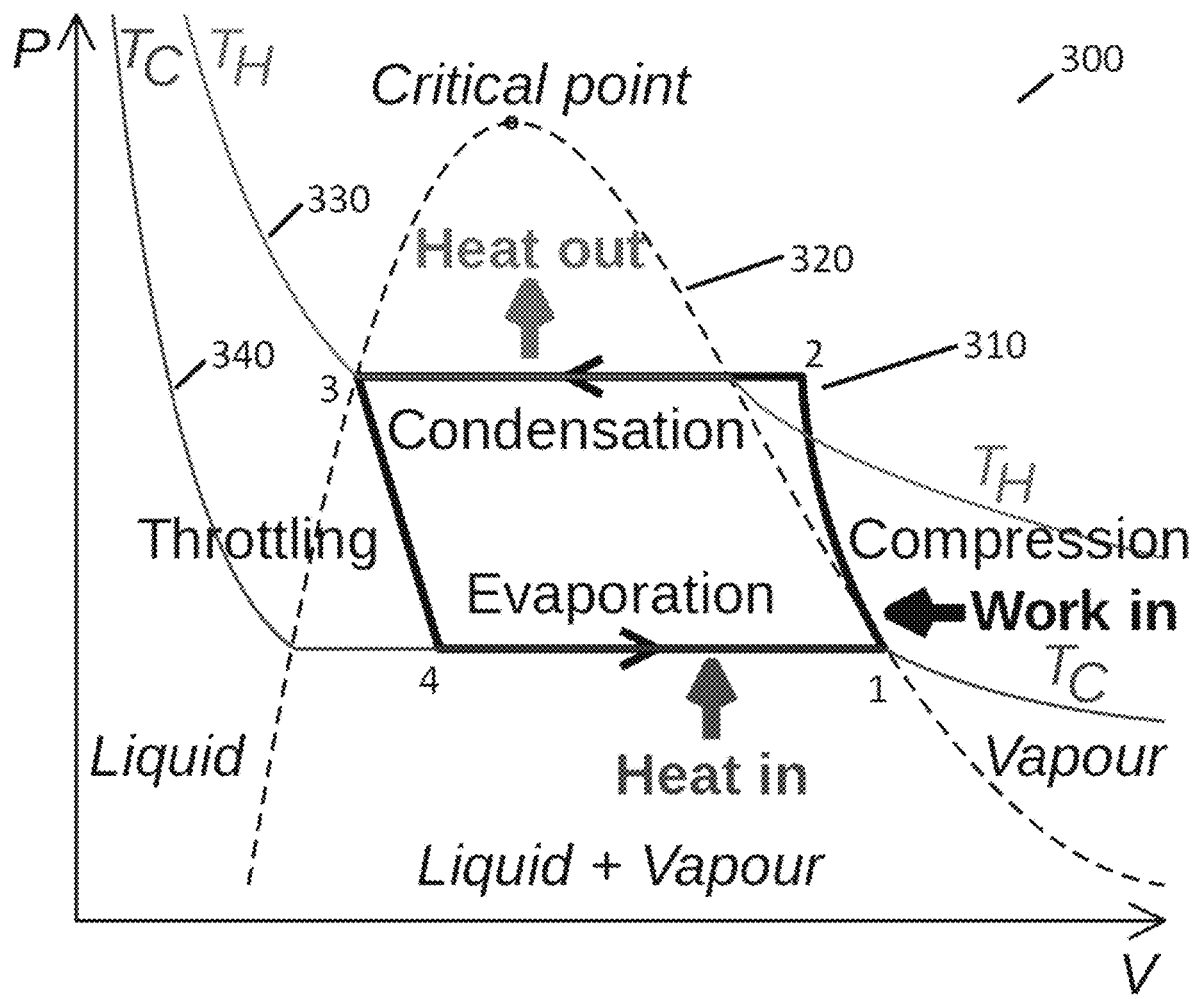
FIG. 2 schematically illustrates a conventional heat pump cycle representing an embodiment of the currently disclosed heat pump circuit on a pressure-volume (e.g., PV) diagram according embodiments to the present disclosure.

FIG. 2 schematically illustrates a conventional heat pump cycle representing an embodiment of the currently disclosed HPC on a pressure-volume (e.g., PV) diagram 300. The heat pump cycle is illustrated by the trace 310 that shows four different points along the cycle. Also on the PV diagram 300 is a line showing the "vapor dome" 320 for the refrigerant, which is a region where the refrigerant is part gas and part liquid state. To the right of the "vapor dome" 320 is the gas state, and to the left is the liquid state. In addition, the PV diagram 300 also has lines representing constant temperature lines at the cold temperature $T_C$ 340 and the hot temperature $T_H$ 330 of the refrigerant as a function of pressure and volume. The traces between the four points represent the four processes that take place in the cycle; compression, condensation, throttling, and evaporation.

Referring to FIGS. 1 and 2, work is performed on the refrigerant by the compressor 210 to increase the temperature and pressure of the refrigerant as the location on the heat pump cycle trace 310 moves from Point 1 to Point 2. As the refrigerant is compressed, the refrigerant is raised to a pressure such that the saturation (phase change) temperature is at the hot temperature $T_H$ 330, after the compressor 210, the temperature of the refrigerant is above that saturation temperature when it reaches point 2 on PV diagram 300. The compression between Point 1 and Point 2 is isentropic. That is between Point 1 and Point 2 the refrigerant is compressed without exchanging any thermal energy with the surroundings. At Point 2, the refrigerant is at a higher temperature, higher pressure, and lower volume than at Point 1. At Point 2, the refrigerant is still in the gas phase at a temperature greater than $T_H$ 330.

The refrigerant then undergoes constant pressure heat rejection as the location on the heat pump cycle trace 310 moves from Point 2 to Point 3 in the condenser 220. This means that the pressure throughout the heat rejection/condensation process remains constant. Since the pressure is constant the phase change temperature is also constant at $T_H$ 330. During this process, heat is rejected from the refrigerant and the volume of the refrigerant is further reduced due to phase change from gas to liquid.

The refrigerant then undergoes constant enthalpy expansion as the location on the heat pump cycle trace 310 moves from Point 3 to Point 4 in the throttle valve 227. The refrigerant expands with throttling and the temperature decreases from the hot temperature $T_H$ to the cold temperature $T_C$ without exchanging heat with the surroundings. The pressure is also decreased from the high pressure after the compressor 210 to the low pressure prior to the compressor 210. As the pressure decreases, the volume must increase since the process exchanges no energy and the refrigerant becomes mixed phase, part liquid, part gas.

The refrigerant then undergoes isobaric heat addition in the evaporator 230 as the location on the heat pump cycle trace 310 moves from Point 4 to Point 1. Similarly to the condenser, this means that the pressure throughout the heat addition/evaporation process remains constant. Since the pressure is constant, the phase change temperature is also constant at $T_C$ 340. During this process heat is added to the refrigerant and the volume of the refrigerant is increased due to the phase change from liquid to gas.

Figure 3:
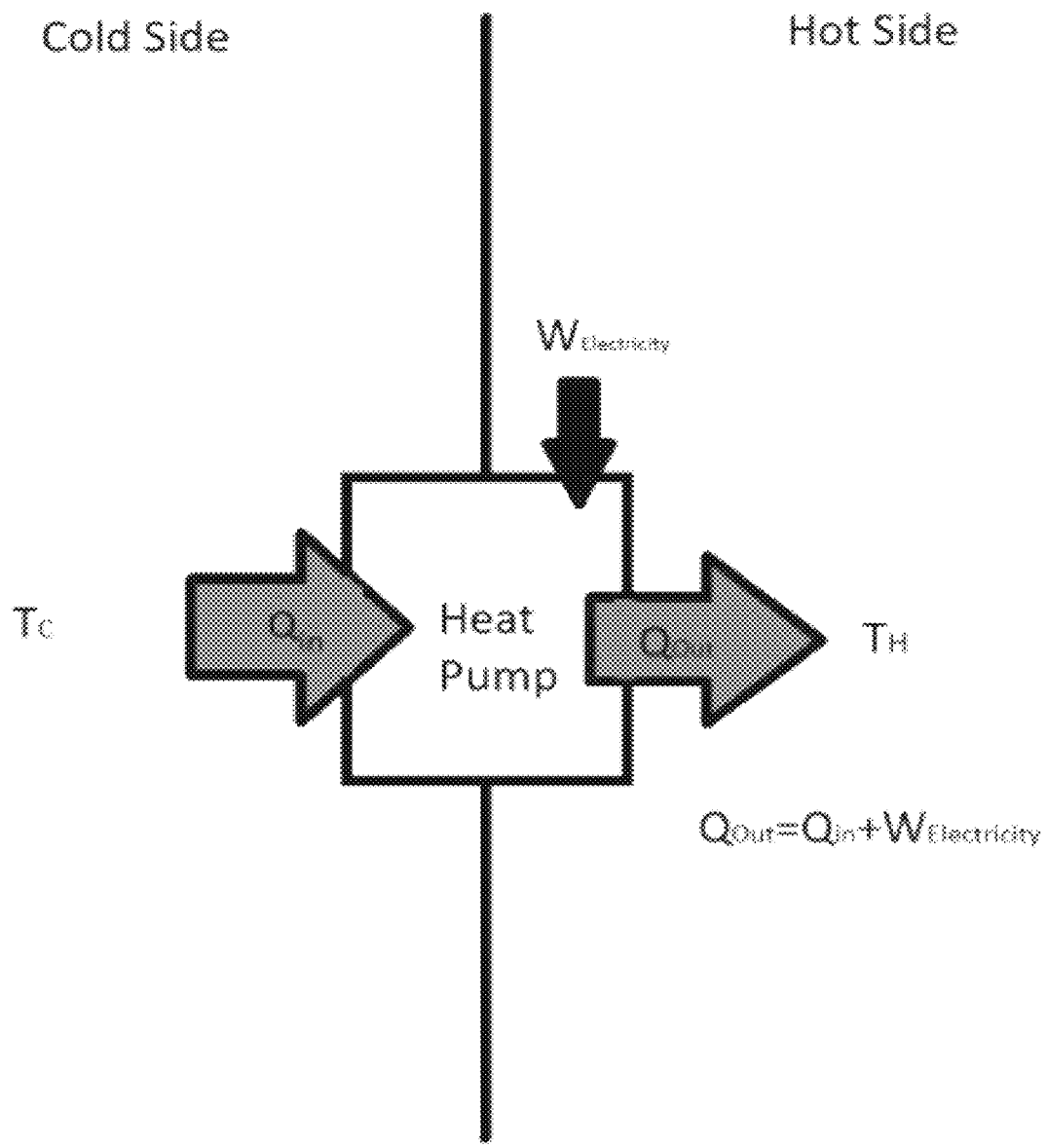
FIG. 3 is a schematic representation of a work flow in a heat pump circuit according to embodiments of the present disclosure.

FIG. 3 is a schematic representation of heat, and electrical work flow in a HPC according to an embodiment of the present disclosure. Since by definition heat pumps move heat from a cold reservoir to a hot reservoir, the heat pump is divided into a "Cold Side" region and a "Hot Side" region. The thermal heat into the HPC is represented by $Q_{in}$, while the thermal heat out of the heat pump is represented by $Q_{out}$. In embodiments, electricity ($W_{in}$) is added to the HPC to power the refrigeration compressor. According to thermodynamics, $Q_{out}=Q_{in}+W_{in}$ and $COP=Q_{useful}/W_{in}$.

Figure 4:
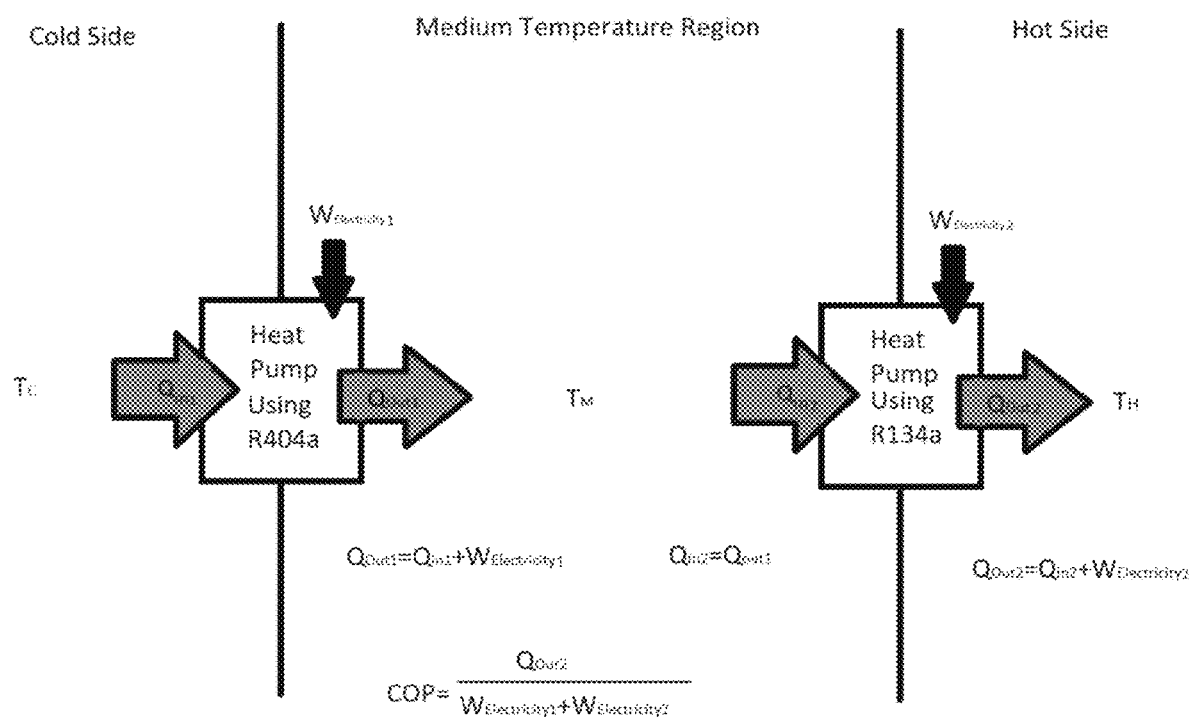
FIG. 4 is a schematic representation of heat and work flow in a cascading heat pump system with two individual heat pump circuits in series with one another, according to embodiments of the present disclosure.

FIG. 4 is a schematic representation of heat and electrical work flow in the HPC according to an embodiment of the present disclosure. As described above for FIG. 3, every HPC has a hot side and a cold side. FIG. 4 schematically illustrates the net heat flow, electrical work in and the COP of a combination of two HPCs to form a that have been placed in series, where the hot side of a first HPC is placed in thermal communication with a cold side of a second HPC.

In this embodiment, the combined two-stage heat pump system starts on the "Cold Side" (left side) of FIG. 4 with $Q_{in1}$ entering the first HPC at a temperature of $T_C$. In order to move the heat from the cold side to the hot side electric work is used in the refrigerant compressor. According to thermodynamics, $Q_{out1}=Q_{in1}+W_{in1}$ and $COP_1=Q_{useful}/Win$.

In the "Medium Temperature Region," heat exits the first HPC in the form of $Q_{out}$ at temperature $T_M$ representing a chosen medium temperature between $T_C$, at the input of the first HPC, and $T_H$, at the output of the second HPC. In the Medium Temperature Region, $Q_{out1}=Q_{in2}$.

On the cold side of the second heat pump circuit, heat in the form of $Q_{in2}$ enters the second heat pump circuit at a temperature of $T_M$. Work $W_{in2}$ is put into the second heat pump circuit in the form of electrical power to operate the refrigeration compressor. Heat is then rejected on the "Hot Side" of the system in the form of $Q_{out2}$ at a temperature of $T_H$. According to thermodynamics, $Q_{out2}=Q_{in2}+W_{in2}$. The combined, two-stage cascading heat pump system has a COP of $COP=Q_{out2}/(W_{in}+W_{in2})$ (if the hot side is the useful side).

Figure 5A:
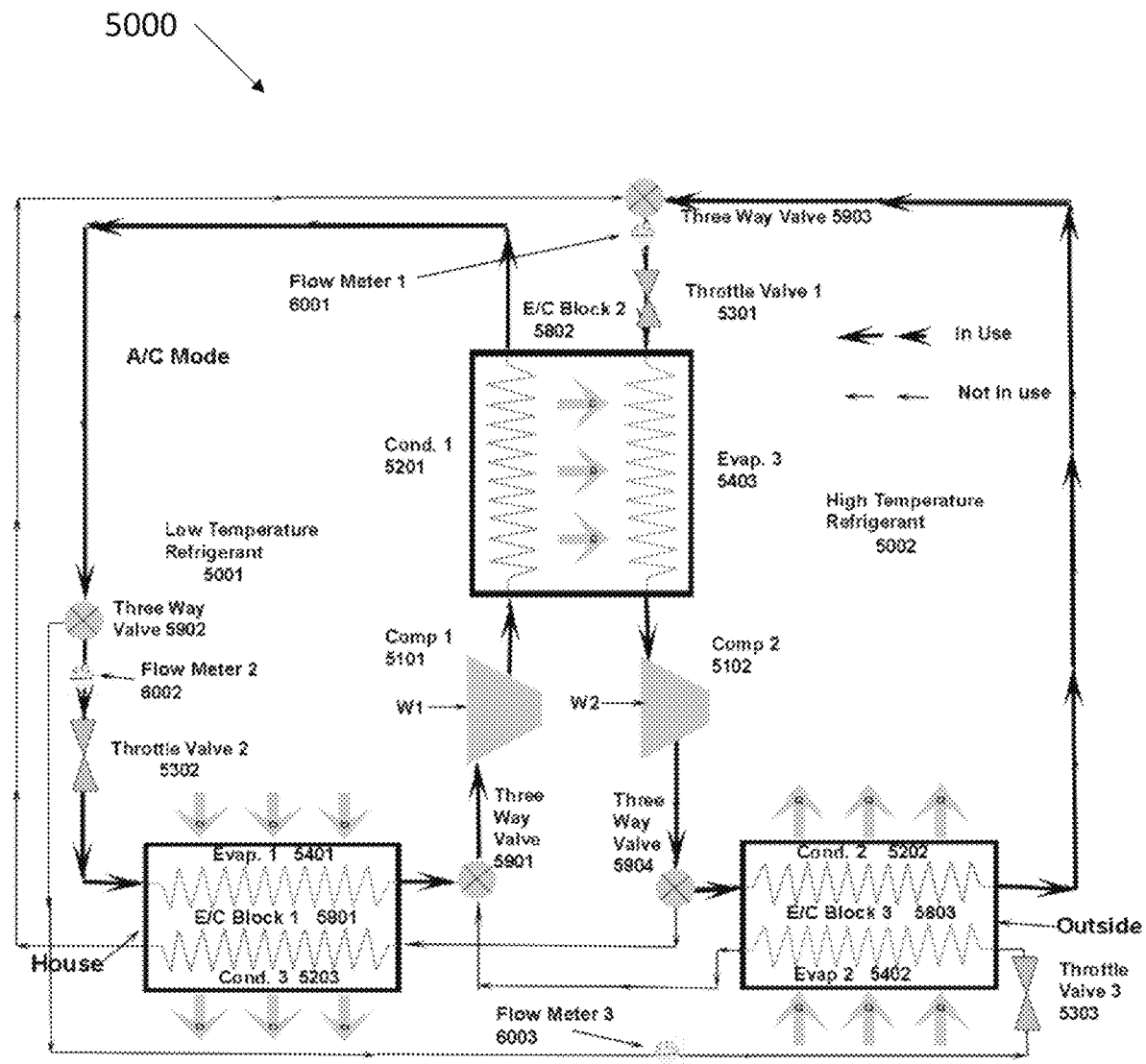
FIG. 5A illustrates a cascading series of heat pump circuits according to embodiments of the present disclosure.
Figure 5B:
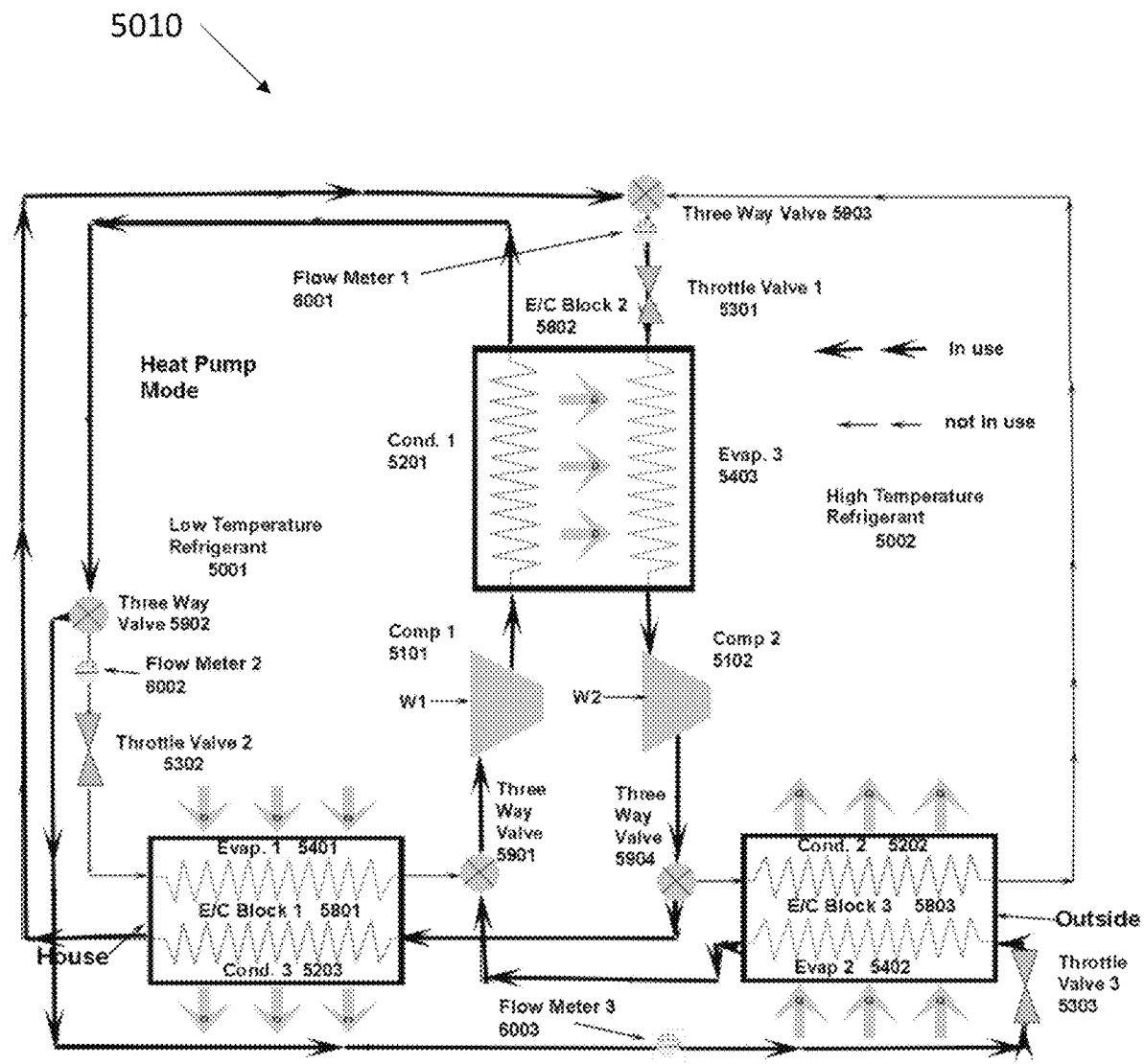
FIG. 5B illustrates a cascading series of air conditioning circuits according to embodiments of the present disclosure.

FIG. 5A and FIG. 5B schematically illustrate a two-stage cascading HPC system that can be selected to operate in heat pump mode (FIG. 5A) or in air conditioner mode (FIG. 5B). In simple terms, a user can switch the two-stage cascading HPC system from one mode to the other by setting three-way valves from one setting to another setting. In one setting, as illustrated in FIG. 5A, the HPC system operates as a building heater that raises the temperature inside of a structure, such as a home or an office building. In another setting, as illustrated in FIG. 5B, the HPC system operates as a building air conditioner that lowers the temperature inside of a structure.

That is, as illustrated in FIGS. 5A and 5B, the components present in the two stage HPC system are the same regardless of whether the system is being operated in the heat pump mode (FIG. 5A) or in the air conditioning mode (FIG. 5B). However, the path taken by the respective refrigerant fluids differs according to the mode in which the system is operating. The different paths are represented in FIGS. 5A and 5B by the weight of the arrows in the figures. The set of heavier weight arrows represent the refrigerant path that is in use in the operational mode illustrated by the given figure, while the set of lighter weight arrows illustrates the path that is not in use in the given operational mode being illustrated.

FIG. 5A illustrates a system 5000 of cascading heat pumps that moves heat from a low temperature region to a high temperature region according to an embodiment of the current disclosure. The operational path of the respective refrigerants is illustrated in FIG. 5A by heavier weighted arrows. The system 5000 uses a cascading series of two heat pump circuits with two compressors. FIG. 5A shows a non-limiting embodiment of a system 5000 having two HPCs, a low temperature HPC 5001 and a high temperature HPC 5002. In some embodiments, there may be as many HPCs that cascade from one to another, with corresponding compressors, as are necessary to reach the desired temperatures. A cascading system may also be called a multistage heat pump system, where each heat pump circuit represents a stage in the movement of heat from a first stage to a last stage.

FIG. 5A shows a two-compressor cascade in series with heat flow moving from low temperature (cold) side 5001 to high temperature (hot) side 5002. The overall temperature change from the lowest temperature $T_C$ of the first (low temperature) E/C block 5801 to the highest temperature $T_H$ of the third (high temperature) E/C block 5803 is broken into two steps as each HPC steps the temperature up successively from the first circuit 5001 to the final circuit (e.g., second) 5002. Each HPC includes a refrigeration compressor, a condenser, a throttle valve, and an evaporator. In embodiments, additional HPC's may be added to span virtually any temperature range desired up to the limit of the refrigerants used and materials available. Since each circuit has a different operating temperature range $\Delta T_x$ between $T_{Hx}$ and $T_{Cx}$, each circuit may have a different refrigerant that is optimized for the specific temperature range $\Delta_{Tx}$.

In the first circuit, HPC 5001, a first refrigerant (e.g., refrigerant) gas is compressed isentropically in the first refrigeration compressor 5101 to initiate the first heat pump cycle 5001. The temperature of refrigerant is raised to just above the first intermediate temperature in the system between $T_H$ and $T_C$. The work performed to compress the first refrigerant is a first work (e.g., $W_1$). The compressed refrigerant is conveyed into first condenser 5201 in a second (intermediate temperature) E/C block 5802. In the second E/C block 5802, the first refrigerant exchanges its heat (Q) with a second refrigerant (refrigerant$_2$) which is in third evaporator 5403 in thermal communication with first condenser 5201. From first condenser 5201, the first refrigerant$_1$ is conveyed through three-way valve 5902 and conveyed on to second throttle valve 5302. Second flow meter 6002 is positioned in-line between three way valve 5902 and the second throttle valve 5302.

The first refrigerant is conveyed to first evaporator 5401 in first E/C block 5801 where the heat from the house is absorbed by the first refrigerant fluid. The first refrigerant moves through three-way valve 5901 to first compressor 5101, where the first refrigerant is compressed. The first refrigerant moves from the first compressor 5101 into the first condenser 5201 where the heat in the refrigerant liquid (primarily in the gaseous state) is exchanged with the heat in the second refrigerant in the third evaporator 5403 in first E/C block 5801. In this exchange, heat flows out of the first refrigerant and into the second refrigerant. On both sides of this exchange the refrigerants are undergoing isobaric heat transfer. The first refrigerant is undergoing phase change from gas to liquid, and the second refrigerant is undergoing phase change from liquid to gas. The combination of the first condenser 5201 and third evaporator 5403 is in E/C block 5802.

In the second circuit, HPC 5002, a second refrigerant (e.g., refrigerant$_2$) gas receives a transfer of heat from the first refrigerant through thermal transfer at the second E/C block 5802. The second refrigerant is conveyed to the second compressor 5102 where it is compressed isentropically in the second refrigeration compressor 5102 to initiate the second heat pump cycle 5002. The temperature of refrigerant$_2$ is raised to just above the first intermediate temperature in the system between $T_H$ and $T_C$. The work performed to compress the second refrigerant is a second work (e.g., $W_2$). The compressed refrigerant$_2$ is conveyed into second condenser 5202 in third (final temperature) E/C block 5803. In the third E/C block 5803, the second refrigerant exhausts its heat (Q) with the outside air. From second condenser 5202, the second refrigerant$_2$ is conveyed through three-way valve 5903 and conveyed through first flow meter 6001 on to first throttle valve 5301. First flow meter 6001 is positioned in-line between three way valve 5903 and the first throttle valve 5301. From first throttle valve 5301, the second refrigerant is conveyed into third evaporator 5403 in the second E/C block 5802.

FIG. 5B shows the same two-compressor cascade as shown in FIG. 5A, except that in FIG. 5B the heat flow is moving in the opposite direction from high temperature (hot) side 5002 to low temperature (cold) side 5001. The overall temperature change from the highest temperature $T_H$ of the second (high temperature) E/C block 5803 to the lowest temperature $T_C$ of the first (low temperature) E/C block 5801 is broken into two steps as each HPC steps the temperature down successively from the second circuit 5002 to the final circuit (e.g., first) 5001. Each HPC includes a refrigeration compressor, a condenser, a throttle valve, and an evaporator. In embodiments, additional HPC's may be added to span virtually any temperature range desired up to the limit of the refrigerants used and materials available. Since each circuit has a different operating temperature range $\Delta T_x$ between $T_{Hx}$ and $T_{Cx}$, each circuit may have a different refrigerant that is optimized for the specific temperature range $\Delta T_x$.

In the first circuit, HPC 5001, a first refrigerant (e.g., refrigerant$_1$) gas is compressed isentropically in the first refrigeration compressor 5101 to initiate the first A/C cycle 5001. The temperature of refrigerant$_1$ is raised to just above the first intermediate temperature in the system between $T_H$ and $T_C$. The work performed to compress the first refrigerant is a first work (e.g., $W_1$). The compressed refrigerant$_1$ is conveyed into first condenser 5201 in a second (intermediate temperature) E/C block 5802. In the second E/C block 5802, the first refrigerant exchanges its heat (Q) with a second refrigerant (refrigerant$_2$) which is in third evaporator 5403 in thermal communication with first condenser 5201. From first condenser 5201, the first refrigerant$_1$ is conveyed through three-way valve 5902 and conveyed on to third throttle valve 5303. Third flow meter 6003 is positioned in-line between three way valve 5902 and the third throttle valve 5303.

The first refrigerant is conveyed to second evaporator 5402 in third E/C block 5803 where the heat from the outside air is absorbed by the first refrigerant fluid. The first refrigerant moves through three-way valve 5901 to first compressor 5101, where the first refrigerant is compressed. The first refrigerant moves from the first compressor 5101 into the first condenser 5201 where the heat in the refrigerant liquid (primarily in the gaseous state) is exchanged with the heat in the second refrigerant in the third evaporator 5403 in second E/C block 5802. In this exchange, heat flows out of the first refrigerant and into the second refrigerant. On both sides of this exchange the refrigerants are undergoing isobaric heat transfer. The first refrigerant is undergoing phase change from gas to liquid, and the second refrigerant is undergoing phase change from liquid to gas. The combination of the first condenser 5201 and third evaporator 5403 is in E/C block 5802.

In the second circuit, HPC 5002, a second refrigerant (e.g., refrigerant$_2$) gas receives a transfer of heat from the first refrigerant through thermal transfer at the second E/C block 5802. The second refrigerant is conveyed to the second compressor 5102 where it is compressed isentropically in the second refrigeration compressor 5102 to initiate the second heat pump cycle 5002. The temperature of refrigerant$_2$ is raised to just above the first intermediate temperature in the system between T$_H$ and T$_C$. The work performed to compress the second refrigerant is a second work (e.g., W$_2$). The compressed refrigerant$_2$ is conveyed into third condenser 5203 in first (final temperature) E/C block 5801. In the first E/C block 5801, the second refrigerant exhausts its cool air into the building. From third condenser 5203, the second refrigerant$_2$ is conveyed through three-way valve 5903 and conveyed through first flow meter 6001 on to first throttle valve 5301. First flow meter 6001 is positioned in-line between three way valve 5903 and the first throttle valve 5301. From first throttle valve 5301, the second refrigerant is conveyed into third evaporator 5403 in the second E/C block 5802.

EXAMPLES

The following examples are intended to further illustrate the disclosure and its preferred embodiments.

Example 1: Comparing Multistage HPCs to Conventional Air Conditioners

Figure 6:
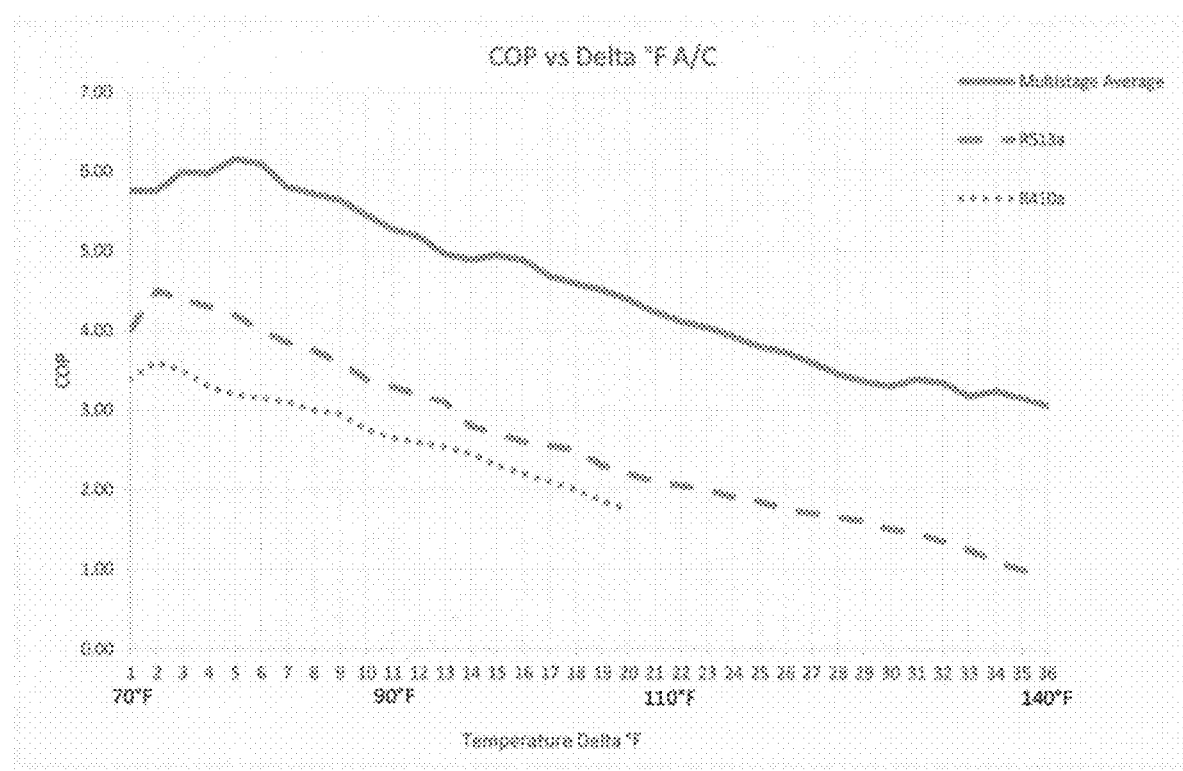
FIG. 6 shows a comparison of two conventional air conditioning systems with a two-stage cascading heat pump circuit according to embodiments of the present disclosure.

An environmental chamber was used to measure COP as a function of temperature as the temperature of the environmental chamber was raised from 70° F. to over 140° F. FIG. 6 shows a comparison of two conventional air conditioning (A/C) systems with a two-stage cascading heat pump circuit. One of the A/C systems used the refrigerant R410a, and the other A/C system used the refrigerant R513a. The disclosed two-stage cascade system (muti stage HTCs) was also tested operating in A/C mode. The cascade A/C system included two HTCs using the same two refrigerants R410a and R513a as the other A/C systems. However, the disclosed cascading system used the R410a refrigerant in the low temperature HPC and the 513a refrigerant in the high temperature HPC.

FIG. 6 shows the results of the experiment. The A/C system using R410A ceased operating at 108° F. This A/C system had a COP of less than 2 with a capacity of 60%.

The A/C system operating with the R513A refrigerant operated up to 140° F., but had a COP of less than 1 and a capacity of 40%.

The multistage system outperformed both of the conventional systems when it comes to how hot the "outside" temperature can be while still having an operational A/C system. It should also be noted that not only was the multistage system still operating at that temperature of 140° F., but was operating with a COP of nearly 3.0 and retained more than 80% of its capacity. Additionally, because of the ability of controlling the Quality of the refrigerant ratio, the cascade system can be adjusted to lower the COP slightly but will retain most of its capacity even at 140° F. with a COP above 2.5.

As an A/C unit, the disclosed system continues to operate well beyond the 140° F. temperature range, but since an air temperature greater than 140° F. is not a condition in which can live humans, further testing was not performed. The 140° F. was to just demonstrate the extraordinary range of the system. The same refrigerants in a single system the R410a stopped at 108° F., but the R513a was still working at 140° F. However, the system using the R513a was close to the critical pressure limit of the compressor, and the COP was less than 1.0.

Example 2: Comparing Multistage HPCs to Conventional Heat Pumps

Figure 7:
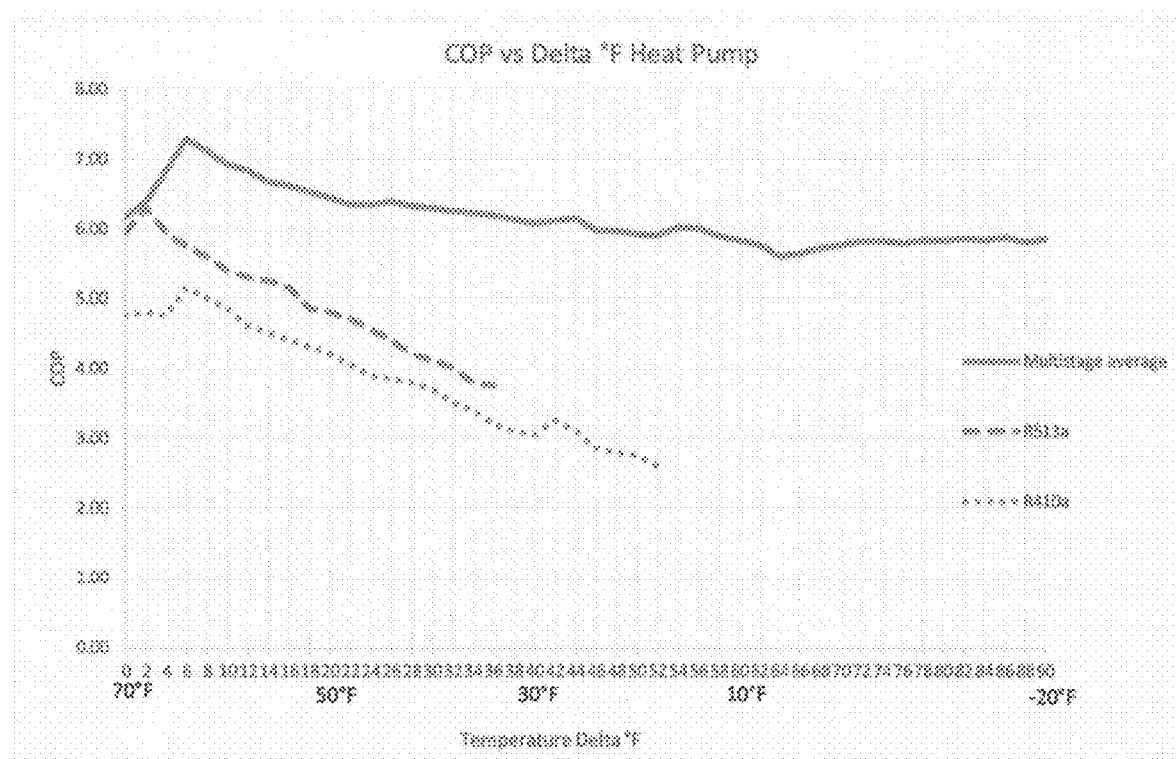
FIG. 7 shows a comparison of two conventional heat pump systems with a two-stage cascading heat pump system according to embodiments of the present disclosure.

An environmental chamber was used to measure COP as a function of temperature as the temperature of the environmental chamber was reduced from 70° F. to below −20° F. The environmental chamber was filled with brined water to prevent freezing. FIG. 7 shows a comparison of two conventional heat pump systems with a two-stage cascading heat pump system. One of the conventional heat pumps used the refrigerant R410a, and the other conventional heat pump used the refrigerant R513a, while the two-stage cascading heat pump system used R513a in the high temperature HPC and used R410a in the low temperature HPC.

The conventional heat pump system that used the R513a refrigerant ceased operating at about 35° F. It had maximum COP of about 6.3 at about 68° F., but the COP decreased to a COP of about 3.8 at 35° F., where the heat pump ceased to operate.

The conventional heat pump system that used the R410a refrigerant ceased operating at about 18° F. It had maximum COP of about 5.2 at about 64° F., but the COP decreased to a COP of about 2.6 at 18° F., where the heat pump ceased to operate.

As shown in FIG. 7, when operated as a heat pump system, the multistage system outperforms both of the conventional systems when it comes to how cold the "outside" temperature can be while still having an operational system. It should also be noted that not only was the multistage system still operating at a temperature of −20° F., but was operating with a COP of over 5.5 and retained more than 60% of its capacity. The other systems, R410A turn off at 18° F. with a COP of 2.5 with a capacity of 45%. Additionally, because of the ability of controlling the Quality of the refrigerant ratio, the cascade system can be adjusted to lower the COP slightly but will retain most of its capacity even at −20° F. but with a COP just above 4. This is a testament to the significant advantages and performance of the cascading HPC system. With this system there is no need for a back heating system.

The cooling measurements were terminated because it met the goals of −20° F. However, the actual temperature the system could achieve has been calculated to be −40° F. Furthermore, because the environmental chamber involves brined water, the cascading HPC system could only protect from freezing to −30° F., because when the coil was at −30° F., the brine was still only at −20° F., so brine began to freeze on the coils making the test was no longer valid. The system should be able to operate at air temperatures below −30° F. Additionally, the calculated lower limit of −40° F. is the limit of the R-410a refrigerant, not inherent limits of the system. A better refrigerant, e.g., a refrigerant capable of operating below −40° F., or an additional HPC with a matching low temperature refrigerant would significantly improve performance and temperature range.

The invention claimed is:
1. A cascading heat pump system, comprising:
 a first heat pump circuit, the first heat pump circuit using
  a first refrigerant configured to raise a first cold operating temperature to a first hot operating temperature, the first heat pump circuit comprising:

a first evaporator positioned in a first exchanger (E/C) block, the first evaporator configured to transfer heat from an outside source to the first refrigerant;

a first compressor in fluid communication with the first evaporator and configured to:
receive the first refrigerant from the first evaporator;
compress the first refrigerant; and
heat the first refrigerant;

a first condenser in fluid communication with the first compressor and configured to condense the first refrigerant;

a second heat pump circuit, the second heat pump circuit using a second refrigerant configured to raise a second cold operating temperature to a second hot operating temperature, the second heat pump circuit in thermal communication with the first heat pump circuit, the thermal communication is through a second E/C block, the second heat pump comprising:

a third evaporator positioned in the second E/C block in thermal communication with the first condenser, the second refrigerant in the third evaporator configured to receive a transfer of heat from the first refrigerant in the first condenser;

a second compressor configured to:
receive the second refrigerant from the third evaporator;
compress the second refrigerant; and
heat the second refrigerant;

a second condenser configured to condense the second refrigerant; and a system controller operatively coupled to the cascading heat pump system, the system controller configured to optimize the coefficient of performance (COP) of the cascading heat pump system as a function of output from at least one of two flow meters and/or system sensors,
wherein:
the second cold operating temperature is equal to the first hot operating temperature; and
a total operating range of the cascading heat pump system is the difference between the first cold operating temperature and the final hot operating temperature.

2. The cascading heat pump system of claim 1, further comprising:
a first throttle valve positioned between the second condenser and the third evaporator, the second refrigerant conveyed from the second condenser to the first throttle valve and from the first throttle valve to the third evaporator;
a first flow meter positioned before the first throttle valve and configured to measure the amount of the second refrigerant entering into the first throttle valve;
a second throttle valve positioned between the first condenser and the first evaporator, the first refrigerant conveyed from the first condenser to the second throttle valve and from the first throttle valve to the first evaporator; and
a second flow meter positioned before the second throttle valve and configured to measure the amount of the first refrigerant entering into the second throttle valve.

3. The cascading heat pump system of claim 1, further comprising:
a third heat pump circuit, the third heat pump circuit using a third refrigerant configured to raise a third cold operating temperature to a third hot operating temperature, the third heat pump circuit in thermal communication with the second heat pump circuit, the third cold operating temperature equal to the second hot operating temperature.

4. The cascading heat pump system of claim 1, wherein the first refrigerant and the second refrigerant each comprise at least one of hydrocarbons, fluorinated hydrocarbons, or water.

5. The cascading heat pump system of claim 4, wherein fluorinated hydrocarbons comprise at least one of R4104a or R5134a.

6. The cascading heat pump system of claim 5, wherein:
the first refrigerant comprises R410a; and
the second refrigerant comprises R513a.

7. The cascading heat pump system of claim 2, wherein the system controller comprises at least one of:
a first proportional-integral-derivative (PID) controller in electrical communication with the first throttle valve and the system controller, the first PID controller configured to control the first throttle valve;
a second PID controller in electrical communication with the second throttle valve and the system controller, the second PID controller configured to control the second throttle valve;
a first variable frequency drive (VFD) in electrical communication with the first compressor and the system controller, the first VFD configured to control a frequency of the first compressor;
a second VFD in electrical communication with the second compressor and the system controller, the second VFD configured to control a frequency of the second compressor;
a first electronic proportioning controller in electrical communication with the first throttle valve and the system controller, the first electronic proportioning controller configured allow low quality second refrigerant fluid ratio to pass into the third evaporator; or
a second electronic proportioning controller in electrical communication with the second throttle valve and the system controller; the second electronic proportioning controller configured allow low quality first refrigerant fluid ratio to pass into the first evaporator.

8. A cascading air conditioning (A/C) system, comprising:
a first A/C circuit, the first A/C circuit using a first refrigerant configured to raise a first cold operating temperature to a first hot operating temperature, the first A/C circuit comprising:
a second evaporator positioned in a second exchanger (E/C) block, the second evaporator configured to transfer heat from an outside source to the first refrigerant;
a first compressor in fluid communication with the second evaporator and configured to:
receive the first refrigerant from the second evaporator;
compress the first refrigerant; and
heat the first refrigerant;
a first condenser in fluid communication with the first compressor and configured to condense the first refrigerant;
a second A/C circuit, the second A/C circuit using a second refrigerant configured to raise a second cold operating temperature to a second hot operating temperature, the second A/C circuit in thermal communication with the first A/C circuit, the thermal communication is through a second E/C block, the second heat pump comprising:

a third evaporator positioned in the second E/C block in thermal communication with the first condenser, the second refrigerant in the third evaporator configured to receive a transfer of heat from the first refrigerant in the first condenser;

a second compressor configured to:
receive the second refrigerant from the third evaporator;
compress the second refrigerant; and
heat the second refrigerant;

a third condenser configured to condense the second refrigerant; and a system controller operatively coupled to the cascading A/C system, the system controller configured to optimize a coefficient of performance (COP) of the cascading A/C system as a function of output from at least one of two flow meters and/or system sensors, wherein:
the second cold operating temperature is approximately equal to the first hot operating temperature; and
a total operating range of the cascading A/C system is the difference between the first cold operating temperature and the final hot operating temperature.

9. The cascading A/C system of claim 8, further comprising:
a first throttle valve positioned between the third condenser and the third evaporator, the second refrigerant conveyed from the third condenser to the first throttle valve and from the first throttle valve to the third evaporator;
a first flow meter positioned before the first throttle valve and configured to measure an amount of the second refrigerant entering into the first throttle valve;
a third throttle valve positioned between the first condenser and the second evaporator, the first refrigerant conveyed from the first condenser to the third throttle valve and from the third throttle valve to the second evaporator; and
a third flow meter positioned before the third throttle valve and configured to measure an amount of the first refrigerant entering into the third throttle valve.

10. The cascading A/C system of claim 8, further comprising:
a third A/C circuit, the third A/C circuit using a third refrigerant configured to raise a third cold operating temperature to a third hot operating temperature, the third A/C circuit in thermal communication with the second heat pump circuit, the third cold operating temperature approximately equal to the second hot operating temperature.

11. The cascading A/C system of claim 8, wherein the first refrigerant and the second refrigerant each comprise at least one of hydrocarbons, fluorinated hydrocarbons, or water.

12. The cascading A/C system of claim 11, wherein fluorinated hydrocarbons comprise at least one of R4104a or R5134a.

13. The cascading A/C system of claim 12, wherein:
the first refrigerant comprises R410a; and
the second refrigerant comprises R513a.

14. The cascading A/C system of claim 9, wherein the system controller comprises at least one of:
a first proportional-integral-derivative (PID) controller in electrical communication with the first throttle valve and the system controller, the first PID controller configured to control the first throttle valve;
a second PID controller in electrical communication with the third throttle valve and the system controller, the second PID controller configured to control the third throttle valve;
a first variable frequency drive (VFD) in electrical communication with the first compressor and the system controller, the first VFD configured to control a frequency of the first compressor;
a second VFD in electrical communication with the second compressor and the system controller, the second VFD configured to control a frequency of the second compressor;
a first electronic proportioning controller in electrical communication with the first throttle valve and the system controller, the first electronic proportioning controller configured allow low quality second refrigerant fluid ratio to pass into the third evaporator; or
a third electronic proportioning controller in electrical communication with the third throttle valve and the system controller; the third electronic proportioning controller configured allow low quality first refrigerant fluid ratio to pass into the second evaporator.

* * * * *